United States Patent
Court et al.

(10) Patent No.: US 6,894,113 B2
(45) Date of Patent: May 17, 2005

(54) THERMOSET MATERIALS WITH IMPROVED IMPACT RESISTANCE

(75) Inventors: Francois Court, Fontaine l'Abbe (FR); Ludwik Leibler, Paris (FR); Jean-Pierre Pascault, Villeurbanne (FR); Sophie Ritzenthaler, Genas (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/296,714

(22) PCT Filed: May 17, 2001

(86) PCT No.: PCT/FR01/01517

§ 371 (c)(1),
(2), (4) Date: Aug. 21, 2003

(87) PCT Pub. No.: WO01/92415

PCT Pub. Date: Dec. 6, 2001

(65) Prior Publication Data

US 2004/0034124 A1 Feb. 19, 2004

(30) Foreign Application Priority Data

May 31, 2000 (FR) .............................................. 00 07024

(51) Int. Cl.⁷ ............................................. C08L 53/00

(52) U.S. Cl. ............................. 525/88; 525/95; 525/98; 525/187

(58) Field of Search .............................. 525/88, 95, 98, 525/187

(56) References Cited

U.S. PATENT DOCUMENTS

| | | |
|---|---|---|
| 3,287,443 A | 11/1966 | Saito et al. |
| 3,657,391 A | 4/1972 | Curfman et al. |
| 3,808,180 A | 4/1974 | Owens et al. |
| 3,985,704 A | 10/1976 | Jones et al. |
| 4,087,480 A * | 5/1978 | Takahashi et al. ............. 525/65 |
| 4,096,202 A | 6/1978 | Farnham et al. |
| 4,180,494 A | 12/1979 | Fromuth et al. |
| 4,260,693 A | 4/1981 | Liu |
| 4,299,928 A | 11/1981 | Witman |
| 4,916,174 A | 4/1990 | Yoshizumi et al. |
| 5,100,935 A * | 3/1992 | Iseler et al. ................. 523/514 |
| 5,216,077 A | 6/1993 | Yoshizumi et al. |

FOREIGN PATENT DOCUMENTS

| | | |
|---|---|---|
| EP | 524 054 | 1/1993 |
| EP | 749 987 | 12/1996 |
| GB | 2 310 214 | 8/1997 |
| JP | 03-215518 | * 9/1991 |
| JP | 3-223377 | 10/1991 |
| JP | 8-245858 | 9/1996 |
| JP | 9-316299 | 12/1997 |

OTHER PUBLICATIONS

Database Chemabs 'en ligne!, Chemical Abstracts Service, Columbus, Ohio, US; Kuramochi, T et al: "Modification of instant adhesive in blending of cyanoacrylate and SIS–g–MMA" XP002162276 STN: abstract No. 121:59130 & Nippon Setchaku Gakkaisha, vol. 30, pp. 207–213.

A. Mazouz, et al., (Polymeric Materials Science and Engineering, 70, p. 13, 1994).

P. Lovell, "An Overview of the Preparation and Use of Emulsion Polymer Particles for the Toughening of Plastics", Macromol. Symp. 92, pp. 71–81, (1995).

A. Mazouz et al., "Toughening of epoxy networks using pre–formed core–shell particles or reactive rubbers", Polymer Bulletin, 33, pp. 67–74, (1994).

H.–J. Sue, et al., "Optimization of Mode–I Fracture Toughness of High–Performance Epoxies by Using Designed Core–Shell Rubber Particles", Toughened Plastics I, Advances in Chemistry Series No. 233, 1993, pp. 259–291.

Marc A. Hillmyer, et al., Self–Assembly and Polymerization of Epoxy Resin–Amphiphillic Block Copolymer Nanocomposites, Journal of the American Chemical Society, 1997, 119, pp. 2749–2750.

Paul M. Lipic, et al., Nanostructured thermosets from Self-Assembled Amphiphilic Block Copolymer/Epoxy Resin Mixtures, Journal of the American Chemical Society, 1998, 120, pp. 8963–8970.

L. Konczol, et al., "Ultimate Properties of Epoxy Resins Modified with a Polysiloxane– Polycaprolactone Block Copolymer", Journal of Applied Polymer Science, vol. 54, 815–826 (1994).

(Continued)

Primary Examiner—Kuo-Liang Peng
(74) Attorney, Agent, or Firm—Smith, Gambrell and Russell, LLP

(57) ABSTRACT

The present invention relates to a thermoset material with improved impact resistance comprising:
  99 to 20% of a thermoset resin, and
  1 to 80% of an impact modifier comprising at least one copolymer comprising S-B-M, B-M and M-B-M blocks,
wherein:
  each block is connected to the other by means of a covalent bond or of an intermediate molecule connected to one of the blocks via a covalent bond and to the other block via another covalent bond,
  M is a PMMA homopolymer or a copolymer comprising at least 50% by weight of methyl methacrylate,
  B is incompatible with the thermoset resin and with the M block and its glass transition temperature Tg is less than the operating temperature of the thermoset material, and
  S is incompatible with the thermoset resin, the B block and the M block and its Tg or its melting temperature is greater than the Tg of B.

S is advantageously polystyrene and B polybutadiene. The thermoset resin advantageously originates from the reaction of a thermosetting epoxy resin and of a hardener.

31 Claims, No Drawings

OTHER PUBLICATIONS

E. Girard–Reydet, et al., "Use of block copolymers to control the morphologies and properties of thermoplastic/thermoset blends", Polymer 40 (1999) No. 40, 1677–1687.

J.G. Williams, et al., "Eureopean Group on Fracture $K_c$ and $G_c$ Methods for Polymers", Polymer Testing, 9 (1990), pp. 15–26.

Julie Y. Qian, et al., "Epoxy Polymers Toughened with Novel Latex Particles", Polymer Materials, 1994, vol. 70, pp. 17–19.

International Preliminary Examination Report (Form PCT/IPEA/416) for PCT/FR01/01517.

PCT Search Report (Form PCT/ISA/210) for PCT/FR01/01517—in French.

Form PCT/IB/308 for PCT/FR01/01517—in French.

Patent Abstracts of Japan, vol. 1998, No. 4, Mar. 31, 1998 & JP 09 316299, Dec. 9, 1997.

Patent Abstracts of Japan, vol. 1997, No. 1, Jan. 31, 1997 & JP 08 245858, Sep. 24, 1996.

Patent Abstracts of Japan, vol. 15, No. 508, Dec. 24, 1991 & JP 03 223377, Oct. 2, 1991.

Qian J Y et al: "Synthesis and Application of Core–Shell Particles as Toughening Agents for Epoxies", Journal of Applied Polymer Science, US, John Wiley and Sons Inc. New York, vol. 58, No. 2, Oct. 10, 1995, pp. 439–447, XP000538689 ISSN: 0021–8995, pp. 439–447.

* cited by examiner

THERMOSET MATERIALS WITH IMPROVED IMPACT RESISTANCE

FIELD OF THE INVENTION

The present invention relates to thermoset materials with improved impact resistance. A thermoset material is defined as being formed of polymer chains of variable length bonded to one another via covalent bonds, so as to form a three-dimensional network. Thermoset materials can be obtained, for example, by reaction of a thermosetting resin, such as an epoxy, with a hardener of amine type. Thermoset materials exhibit numerous advantageous properties which allow them to be used as structural adhesives or as a matrix for composite materials or in applications for protecting electronic components. The materials of the invention comprise a thermoset resin and a block copolymer having at least one block predominantly composed of methyl methacrylate units. These materials can be manufactured by dissolution of the copolymer in the thermosetting resin, followed by addition of the hardener and crosslinking under hot conditions.

BACKGROUND OF THE INVENTION

The epoxy materials have a high crosslinking density, which provides them with a high glass transition temperature Tg, which confers excellent thermomechanical properties on the material. The higher the crosslinking density, the higher the Tg of the material and consequently the better the thermomechanical properties: the higher the operating temperature limit of the material. Nevertheless, the impact strength properties of epoxy materials are insufficient for numerous applications. Numerous solutions have been developed to attempt to respond to this problem. At the same time, while all epoxy materials are difficult to strengthen with regard to impacts, epoxy materials with high Tg values are the most difficult. Numerous studi s have been devoted to the impact strengthening of these epoxy materials with high Tg values and these studies conclude that the addition of rubber to an epoxy material with a high Tg value does not have a strengthening effect. Mention may be made, as examples of such materials, of BADGE/DDS systems (Tg= 220° C.), in which DDS denotes diaminodiphenyl sulphone, or BADGE/MCDEA systems (Tg=180° C.), in which MCDEA denotes 4,4'-methylenebis(3-chloro-2,6-diethylaniline). In the preceding materials, BADGE denotes bisphenol A diglycidyl ether.

The addition of Reactive rubbers (ATBN, CTBN) has been disclosed.

These abbreviations mean:

CTBN: Carboxyl-terminated random copolymer of butadiene and acrylonitrile,

ATBN: Amino-terminated random copolymer of butadiene and acrylonitrile.

These products are oligomers based on butadiene and on acrylonitrile which are terminated either by carboxyl functional groups or by amine functional groups. Butadiene has a very low Tg, which is favourable for producing good strengthening with regard to impacts, but it is immiscible with epoxy resins. A certain percentage of acrylonitrile is copolymerized with the butadiene in order for the product formed to be initially miscible with the epoxy resin and thus to be able to be easily incorporated in the latter. P. Lovell (Macromol. Symp. 92, pages 71–81, 1995) and A. Mazouz et al., (Polymer Material Science Engineering, 70, p. 13, 1994) say that, on conclusion of the crosslinking reaction, a portion of the functional oligomer forms elastomer particles and a not insignificant portion remains incorporated in the matrix. This is reflected by a fall in the Tg of the material obtained with respect to the pure epoxy network, which is undesirable for applications requiring good thermomechanical properties. The elastomer domains formed have a large size conventionally of between 0.5 microns and 5 microns. The strengthening obtained is not satisfactory.

For all these reasons, other solutions for the impact strengthening of epoxy networks have been sought. Mention may be made, for example, of P. Lovell (Macromol. Symp. 92, pages 71–81, 1995), who establishes that strengthening with preformed core-shell particles leads to better results.

As regards strengthening with preformed core-shell particles: these are preformed particles with an elastomer core, with a glass transition temperature of less than −20° C., and a rigid shell, with a glass transition temperature of greater than 50° C., which may or may not carry reactive functional groups. A reactive functional group is defined as a chemical group capable of reacting with the oxirane functional groups of epoxy molecules or with the chemical groups of the hardener. Mention may be made, as non-limiting examples of reactive functional groups, of: oxirane functional groups, amine functional groups or carboxyl functional groups. These particles of well defined size are added to the reactants (epoxy and hardener). After reaction, the material formed is characterized by a dispersion of these particles within the thermoset matrix. The elastomer particles in the material obtained have the same size as at the start, before the reaction. This result is well known; mention may be made, as examples of the prior art describing it, of, for example, the article by Maazouz et al., Polymer Bulletin 33, pages 67–74, 1994, and by Sue et al., Rubber-Toughened Plastics, 1993, pages 259–291 (cf. page 261).

These preformed particles are obtained by a two-stage emulsion synthesis; the elastomer core is synthesized during the first stage and the shell is grafted onto the core during the second stage. This synthetic process results in particles with a core size varying between 30 nanometres and 2 microns (Sue et al., Rubber-Toughened Plastics, 1993, pages 259–291 (cf. page 261)). Numerous studies have been devoted to determining the size of the elastomer core of the particle for producing optimum impact strengthening. These studies show that, with preformed particles, satisfactory strengthening can only be obtained for particle sizes of greater than 120 nanometres.

Given the size of the elastomer domains in the material obtained, the latter is not transparent. This opaqueness is an impediment in some applications. This is the case, for example, with applications of thermoset materials in composites where the manufacturer wishes to be able to visually observe the quality of his structure (thermoset material+ fibres or thermoset material+fillers). Mention may also be made of the example of electronic applications of epoxy materials; the opaqueness of the material is harmful as it is an impediment to the user.

The prior art has also described the addition of a PEO-PEE Diblock:

Hillmyer et al. (M. A. Hillmyer, P. M. Lipic, D. A. Hajduk, K. Almdal, F. S. Bates, Journal of the American Chemical Society, 1997, 119, 2749–2750) have carried out studies on mixtures of a thermosetting epoxy/phthalic anhydride system and of an A-B diblock, where A is poly(ethylene oxide) and B is poly(ethylethylene), PEO-PEE. These authors have shown that the material obtained is characterized by a very specific morphology. It is composed of a thermoset matrix in which are evenly distributed PEE cylinders all having the same diameter of 5 to 10 nanometres, the cylinders themselves being surrounded by a shell (or by a sheath) of PEO with a thickness of a few nanometres. The authors found that the materials obtained were transparent but they did not study their properties nor allude to the properties which they might exhibit.

The addition of a PEO-PEP diblock to a BADGE-MDA system has also been described (Lipic P M, Bates F S and Hillmyer M A, Journal of the American Chemical Society, 1998, 120, 8963–8970). MDA denotes methylenediamine. The studies and the results are equivalent to those in the preceding paragraph.

The addition of a Polysiloxane-Polycaprolactone block copolymer has also been described: PCL-b-PDMS-b-PCL and $(PCL)_2$-b-PDMS-b-$(PCL)_2$. Könczol et al. (Journal of Applied Polymer Science, vol. 54, pages 815–826, 1994) have studied blends between an epoxy/anhydride system and a PCL-b-PDMS-b-PCL or $(PCL)_2$-b-PDMS-b-$(PCL)_2$ multiblock copolymer, where PCL denotes polycaprolactone and PDMS polydimethylsiloxane. The authors show that the material obtained is transparent and that the addition of 5% to 15% of copolymer makes possible a significant improvement in the impact strength of the epoxy material.

The prior art also refers to the use of block copolymers in compatibilizing thermoplastic/thermoset systems. Thus, Girard-Reydet et al., Polymer, 1999, No. 40, page 1677, have studied thermoplastic/thermoset blends where the thermoplastic is either PPE (polyphenylene ether) or PEI (polyetherimide) and the thermoset system is the BADGE/MCDEA pair. These blends are brittle. The authors have found that the use of a maleized copolymer comprising SEBS blocks, modified beforehand by reaction with a monoamine or a diamine (such as MCDEA), made it possible to improve the impact strength of the thermoplastic/thermoset blend.

The addition of block copolymers having at least one block predominantly composed of methyl methacrylate units has not been disclosed in the prior art. It has now been found that the addition of block copolymers having at least one block predominantly composed of methyl methacrylate units to thermoset materials results in thermoset materials with improved impact resistance. Furthermore, these materials remain transparent and the Tg is maintained or is not lowered by more than 12° C. It is possible, in addition to the block copolymer predominantly composed of methyl methacrylate units, to add other block copolymers or impact modifiers, such as core-shells or functionalized elastomers. Depending on the nature of these modifiers added in addition, the material may not remain transparent but the impact strength is very greatly improved.

BRIEF DESCRIPTION OF THE INVENTION

The present invention relates to a thermoset material with improved impact resistance comprising:
99 to 20% of a thermoset resin,
1 to 80% of an impact modifier comprising at least one copolymer chosen from copolymers comprising S-B-M, B-M and M-B-M blocks, in which:
  each block is connected to the other by means of a covalent bond or of an intermediate molecule connected to one of the blocks via a covalent bond and to the other block via another covalent bond,
  M is a PMMA homopolymer or a copolymer comprising at least 50% by weight of methyl m thacrylate,
  B is incompatible with the thermoset resin and with the M block and its glass transition temperature Tg is less than the operating temperature of the thermoset material,
  S is incompatible with the thermoset resin, the B block and the M block and its Tg or its melting temperature M.t. is greater than the Tg of B.

DETAILED DESCRIPTION OF THE INVENTION

As regards the thermoset material, it is defined as being formed of polymer chains of variable length bonded to one another via covalent bonds, so as to form a three-dimensional network.

Mention may be made, by way of examples, of cyanoacrylates, bismaleimides and epoxy resins crosslinked by a hardener.

Mention may be made, among cyanoacrylates, of 2-cyanoacrylic esters, which are thermoset materials obtained by polymerization of the monomer $CH2=C(CN)COOR$ with various possible R groups (without requiring the addition of a hardener).

The thermoset formulations of bismaleimide type are, for example:
methylenedianiline+benzophenone dianhydride+nadic imide methylenedianiline+benzophenone dianhydride+phenylacetylene methylenedianiline+maleic anhydride+maleimide.

The thermoset material advantageously originates from the reaction of a thermosetting epoxy resin and of a hardener. It is also defined as any product from the reaction of an oligomer carrying oxirane functional groups and of a hardener. The reactions involved during the reaction of these epoxy resins result in a crosslinked material corresponding to a three-dimensional network which is more or less dense according to the basic characteristics of the resins and hardeners employed.

The term "epoxy resin", hereafter denoted by E, is understood to mean any organic compound having at least two functional groups of oxirane type which can be polymerized by ring opening. The term "epoxy resins" d notes any conventional epoxy resin which is liquid at room temperature (23° C.) or at a higher temperature. These epoxy r sins can be monomeric or polymeric, on the one hand, aliphatic, cycloaliphatic, heterocyclic or aromatic, on the other hand. Mention may be made, as examples of such epoxy resins, of resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl)methane, polyglycidyl ethers of phenol-formaldehyde novolak, polyglycidyl ethers of ortho-cresol novolak and tetraglycidyl ethers of tetraphenyl-ethane. Mixtures of at least two of these resins can also be used.

Epoxy resins having at least 1.5 oxirane functional groups per molecule or more particularly epoxy resins comprising between 2 and 4 oxirane functional groups per molecule are preferred. Epoxy resins having at least one aromatic ring, such as bisphenol A diglycidyl ethers, are also preferred.

As regards the hardener, use is generally made, as hardeners, of hardeners for epoxy resins which react at room temperature or at temperatures higher than room temperature. Mention may be made, as non-limiting examples, of:
  acid anhydrides, including succinic anhydride,
  aromatic or aliphatic polyamines, including diamino-diphenyl sulphone (DDS) or methylenedianiline or 4,4'-methylenebis(3-chloro-2,6-diethylaniline) (MCDEA),
  dicyandiamide and its derivatives,
  imidazoles, polycarboxylic acids,
polyphenols.

As regards the B-M diblock, M is composed of methyl methacrylate monomers or comprises at least 50% by mass of methyl methacrylate, preferably at least 75% by mass of methyl methacrylate. The other monomers constituting the M block can be acrylic or nonacrylic monomers and may or may not be reactive. The term "reactive monomer" is understood to mean: a chemical group capable of reacting with the oxirane functional groups of the epoxy molecules or with the chemical groups of the harden rs. Mention may be made, as non-limiting examples of reactive functional groups, of: oxirane functional groups, amine functional groups or carboxyl functional groups. The reactive monomer can be (meth)acrylic acid or any other hydrolysable monomer resulting in these acids. Mention may be made, among the other monomers which can constitute the M block, as non-limiting examples, of glycidyl methacrylate or tert-butyl methacrylate. M is advantageously composed of syndiotactic PMMA to at least 60%.

The Tg of B is advantageously less than 0° C. and preferably less than −40° C.

The monomer used to synthesize the elastomeric B block can be a diene chosen from butadiene, isoprene, 2,3-dimethyl-1,3-butadiene, 1,3-pentadiene or 2-phenyl-1,3-butadiene. B is advantageously chosen from poly(dienes), in particular poly(butadiene), poly(isoprene) and their random copolymers, or from partially or completely hydrogenated poly(dienes). Use is advantageously made, among polybutadienes, of those with the lowest Tg, for example 1,4-polybutadiene with a Tg (approximately −90° C.) lower than that of 1,2-polybutadiene (approximately 0° C.). The B blocks can also be hydrogenated. This hydrogenation is carried out according to the usual techniques.

The monomer used to synthesize the elastomeric B block can also be an alkyl (meth)acrylate. The following Tg values (between brackets following the name of the acrylate) are obtained: ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). Butyl acrylate is advantageously used. The acrylates are different from those in the M block in order to observe the condition that B and M are incompatible.

The B blocks are preferably predominantly composed of 1,4-polybutadiene.

The B-M diblock has a number-average molar mass which can be between 10,000 g/mol and 500,000 g/mol, preferably between 20,000 and 200,000 g/mol. The B-M diblock is advantageously composed of a fraction by mass of M of between 5 and 95% and preferably between 15 and 85%.

A r gards the M-B-M triblock, M is composed of the sam monomers and optionally comonomers as the M block of the B-M diblock. The two M blocks of the M-B-M triblock can be identical or different. They can also be different in their molar mass but composed of the same monomers. The M blocks of the M-B-M triblock can be identical to or different from the M block of the B-M diblock. The B block is composed of the same monomers and optionally comonomers as the B block of the B-M diblock. The B blocks of the M-B-M triblock and of the B-M diblock can be identical or different.

The M-B-M triblock has a number-average molar mass which can be between 10,000 g/mol and 500,000 g/mol, preferably between 20,000 and 200,000 g/mol. The M-B-M triblock advantageously has the following compositions with regard to M and B, expressed as fraction by mass, the total being 100%:

M: between 10 and 80% and preferably between 15 and 70%,
B: between 90 and 20% and preferably between 85 and 30%.

As regards the S-B-M triblock, M is composed of the same monomers and optionally comonomers as the M block of the B-M diblock. The M block of the S-B-M triblock, each M block of the M-B-M triblock and the M block of the B-M diblock can be identical or different. The B block is composed of the same monomers and optionally comonomers as the B block of the B-M diblock. The B blocks of the S-B-M triblock, of the M-B-M triblock and of the B-M diblock can be identical or different.

The Tg or the M.t. of S is advantageously greater than 23° C. and preferably greater than 50° C. Mention may be made, as examples of S blocks, of those which derive from vinylaromatic compounds, such as styrene, α-methylstyrene or vinyltoluene, and those which derive from alkyl esters of acrylic acid and/or methacrylic acid having from 1 to 18 carbon atoms in the alkyl chain. In the latter case, the acrylates are different from those of the M block, in order to observe the condition that S and M are incompatible.

The S-B-M triblock has a number-average molar mass which can be between 10,000 g/mol and 500,000 g/mol, preferably between 20,000 and 200,000 g/mol. The S-B-M triblock advantag ously has the following composition, expressed as fraction by mass, the total being 100%:

M: between 10 and 80% and preferably between 15 and 70%,
B: between 2 and 80% and preferably between 5 and 70%,
S: between 10 and 88% and preferably between 15 and 85%.

The block copolymers used in the materials of the present invention can be manufactured by anionic polymerization, for example according to the processes disclosed in Patent Applications EP 524,054 and EP 749,987.

The proportion of impact modifier is advantageously from 1 to 35% for respectively 99 to 65% of thermoset resin.

The proportion of impact modifier is preferably from 8 to 32% for respectively 92 to 68% of thermoset resin.

According to a preferred form of the invention, the impact modifier comprises at least one of the M-B-M and S-B-M block copolymers and at least one polymer chosen from core-shells (A), functionalized elastomers, S-B block copolymers and ATBN and CTBN reactive rubbers.

As regards the S-B diblock, the S and B blocks are incompatible and they are composed of the same monomers and optionally comonomers as the S blocks and the B blocks of the S-B-M triblock. The S and B blocks can be identical to or different from the other S and B blocks present in the other block copolymers of the impact modifier in the thermoset material.

The S-B diblock has a number-average molar mass which can be between 10,000 g/mol and 500,000 g/mol, preferably between 20,000 and 200,000 g/mol. The S-B diblock is advantageously composed of a fraction by mass of B of between 5 and 95% and preferably between 15 and 85%.

As regards the core-shell copolymer (A), it is provided in the form of fine particles having an elastomer core and at least one thermoplastic shell, the size of the particles generally being less than 1 μm and advantageously between 50 and 500 nm. Mention may be made, as examples of cores, of homopolymers of isoprene or of butadiene, copolymers of isoprene with at most 30 mol % of a vinyl monomer and copolymers of butadiene with at most 30 mol % of a vinyl monomer. The vinyl monomer can be styren, an alkylstyrene, acrylonitrile or an alkyl (meth)acrylate. Another core family is composed of homopolymers of an alkyl (meth)acrylate and copolymers of an alkyl (meth)

acrylate with at most 30 mol % of a vinyl monomer. The alkyl (meth)acrylate is advantageously butyl acrylate. The vinyl monomer can be styrene, an alkylstyrene, acrylonitrile, butadiene or isoprene. The core of the copolymer (A) can be crosslinked in all or part. It is sufficient to add at least 5 difunctional monomers during the preparation of the core. These monomers can be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. It is also possible to crosslink the core by introducing therein, by grafting or as comonomer during the polymerization, unsaturated functional monomers, such as unsaturated carboxylic acid anhydrides, unsaturated carboxylic acids and unsaturated epoxides. Mention may be made, as examples, of maleic anhydride, (meth)acrylic acid and glycidyl methacrylate.

The shell or shells are homopolymers of styrene, of an alkylstyrene or of methyl methacrylate or copolymers comprising at least 70 mol % of one of these above monomers and at least one comonomer chosen from the other above monomers, vinyl acetate and acrylonitrile. The shell can be functionalized by introducing therein, by grafting or as comonomer during the polymerization, unsaturated functional monomers, such as unsaturated carboxylic acid anhydrides, unsaturated carboxylic acids and unsaturated epoxides. Mention may be made, as examples, of maleic anhydride, (meth)acrylic acid and glycidyl methacrylate. Mention may be made, as examples, of core-shell copolymers (A) having a polystyrene shell and core-shell copolymers (A) having a PMMA shell. There also exist core-shell copolymers (A) having two shells, one made of polystyrene and the other, on the outside, made of PMMA. Examples of copolymer (A) and their process of preparation are disclosed in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928 and U.S. Pat. No. 3,985,704.

The core advantageously represents, by w ight, 70 to 90% of (A) and the shell 30 to 10%.

Mention may be made, as example of copolymer (A), of that composed (i) of 75 to 80 parts of a core comprising, in moles, at least 93% of butadiene, 5% of styrene and 0.5 to 1% of divinylbenzene and (ii) of 25 to 20 parts of two shells essentially of the same weight, the internal one made of polystyrene and the other, external, made of PMMA.

According to a second preferred form of the invention, the impact modifier comprises at least one S-B-M block copolymer and at least one S-B block copolymer. The impact modifier advantageously comprises between 5 and 80% of S-B diblock for respectively from 95 to 20% of S-B-M triblock.

Furthermore, the advantage of these compositions is that it is not necessary to purify the S-B-M on conclusion of its synthesis. This is because the S-B-M units are generally prepared from S-B units and the reaction often results in a mixture of S-B and S-B-M which is subsequently separated in order to have available S-B-M.

According to a third preferred form of the invention, the impact modifier comprises at least one S-B-M block copolymer and at least one core-shell polymer (A). The proportion of core-shell with respect to the S-B-M can be between 5 for 1 and 1 for 4 and preferably between 3 for 1 and 1 for 2.

According to a fourth preferred form of the invention, the impact modifier comprises at least one S-B-M block copolymer and at least one ATBN or CTBN reactive rubber. The proportion of reactive rubber with respect to the S-B-M can be between 5 for 1 and 1 for 4, preferably between 3 for 1 and 1 for 2.

According to an advantageous form, a portion of the S-B-M can be replaced with an S-B diblock. This portion can be up to 70% by weight of the S-B-M.

It will not be departing from the scope of the invention to replace all or part of th S-B-M triblock with an M-S-B-S-M or M-B-S-B-M pentablock. They can be prepared by anionic polymerization, like the di- or triblocks mentioned above, but by using a difunctional initiator. The number-average molar mass of these pentablocks is within the same ranges as that of the S-B-M triblocks. The proportion of the two M blocks together or of the two B or S blocks together is within the same ranges as the proportions of S, B and M in the S-B-M triblock.

The materials of the invention can be prepared by blending the thermoset resin, not yet crosslinked, and the impact modifier using a conventional blending device.

As regards the epoxy resins, the materials of the invention with a low percentage of impact modifier ($\leq 10\%$ by mass) can be prepared using a conventional stirred reactor. The thermosetting epoxy resin is introduced into the reactor and brought for a few minutes to a temperature sufficient to be fluid. The impact modifier comprising the block copolymers is subsequently added and kneaded at a temperature sufficient to be fluid until it has completely dissolved. The kneading time depends on the nature of the copolymer added. The hardener is then added and blending is carried out for a further 5 minutes at a temperature sufficient to be fluid in order to obtain a homogeneous blend. The epoxy-hardener reaction begins during this blending and it must therefore be arranged to be as short as possible. These blends are subsequently cast and cured in a mould.

For the materials with a level of impact modifier of greater than 10% by mass, a preblend of the thermosetting resin and of the impact modifier comprising 10% by mass of impact modifier is prepared according to the following method: after having brought the thermosetting resin to a temperature sufficient to be fluid for a few minutes, the impact modifier is added and blended at a temperature sufficient to be fluid until it has completely dissolved. The mass of impact modifier lacking to achieve the desired level is then blended with this preblend using a calender or a twin-screw mixer at a temperature sufficient to be fluid for one hour. The thermosetting resin/impact modifier system obtained is then cooled and cryogenically milled and the hardener is added. The final blend is pressed in a mould at the desired curing temperature.

Curing Conditions:

These are the usual conditions.

It would not be departing from the scope of the invention to add the usual additives to the thermoset materials.

EXAMPLES

The following products were used:

Epoxy resin: it is a bisphenol A diglycidyl ether (BADGE) with a molar mass of 383 g/mol, with a mean number of hydroxyl groups per one epoxy group of n=0.075, sold by the company Ciba Geigy under the commercial reference LY556.

Hardener: it is an amine hardener which is an aromatic diamine, 4,4'-methylenebis(3-chloro-2,6-diethylaniline), sold by the company Lonza under the commercial reference Lonzacure M-CDEA. This product is characterized by a melting point of between 87° C. and 90° C. and a molar mass of 380 g/mol.

Impact Modifiers

PB (Polybutadiene): it is a butadiene homopolymer obtained by anionic synthesis using a secondary butyllithium initiator, with a number-average molar mass of 42,000 g/mol. This product was prepared according to the procedure disclosed in EP 524,054 and in EP 749,987. It is characterized by a glass transition of −90° C.

PMMA (Poly(methyl methacrylate)): it is a strongly syndiotactic (72%) methyl methacrylate homopolymer obtained by anionic synthesis using a secondary butyllithium initiator with a number-average molar mass of 54,000 g/mol. It is characterized by a glass transition of 132° C.

BM1: it is a B-M diblock copolymer in which B is polybutadiene and M is PMMA, comprising 35% as fraction by mass of polybutadiene and 65% by mass of poly(methyl methacrylate), obtained by anionic polymerization successively of a polybutadiene block with a mass of 42,000 g/mol and of a poly(methyl methacrylate) block with a number-average molar mass of 75,000 g/mol. This product was prepared according to the procedure disclosed in EP 524,054 and in EP 749,987. This product exhibits two glass transitions, one of −90° C. and the other of 132° C.

SB1: it is an S-B diblock copolymer in which S is polystyrene and B is polybutadiene, comprising 29% as fraction by mass of polybutadiene and 71% by mass of polystyrene, obtained by anionic polymerization successively of a polystyrene block with a number-average molar mass of 27,000 g/mol and of a polybutadiene block with a mass of 11,000 g/mol. This product was prepared according to the procedure disclosed in EP 524,054 and in EP 749,987. This product exhibits two glass transitions, one of −90° C. and the other of 95° C.

SB2: it is an S-B diblock copolymer in which S is polystyrene and B is polybutadiene, comprising 65% as fraction by mass of polybutadiene and 35% by mass of polystyrene, obtained by anionic polymerization successively of a polystyrene block with a number-average molar mass of 14,000 g/mol and of a polybutadiene block with a mass of 22,000 g/mol. This product was prepared according to the procedure disclosed in EP 524,054 and in EP 749,987. This product exhibits two glass transitions, one of −90° C. and the other of 95° C.

SB3: it is an S-B diblock copolymer in which S is polystyrene and B is polybutadiene, comprising 52% as fraction by mass of polybutadiene and 48% by mass of polystyrene, obtained by anionic polymerization successively of a polystyrene block with a number-average molar mass of 21,000 g/mol and of a polybutadiene block with a mass of 22,000 g/mol. This product was prepared according to the procedure disclosed in EP 524,054 and in EP 749,987. This product exhibits two glass transitions, one of −90° C. and the other of 95° C.

Core-shell 1 (CS1): it comprises preformed core-shell particles composed of a core predominantly composed of polybutadiene with a diameter of between 80 and 120 nanometres and of a shell based on methyl methacrylate sold by the company Métablen under the reference C140.

PCL-PDMS-PCL: polycaprolactone-polysiloxan-polycaprolactone copolymer of PCL-PDMS-PCL triblock type:
it is a triblock copolymer produced and sold by the company Goldschmidt under the reference Tegomer H-Si 6440. It has a molar mass of 6500 g/mol.

SBM1: it is an S-B-M triblock copolymer in which S is polystyrene, B is polybutadiene and M is PMMA, comprising 22% as fraction by mass of polystyrene, 9% as fraction by mass of polybutadiene and 69% by mass of poly(methyl methacrylate), obtained by anionic polymerization successively of a polystyrene block with a number-average molar mass of 27,000 g/mol, of a polybutadiene block with a mass of 11,000 g/mol and of a poly(methyl methacrylate) block with a number-average molar mass of 84,000 g/mol. This product was prepared according to the procedure disclosed in EP 524,054 and in EP 749,987. This product exhibits three glass transitions, one of −90° C., another of 95° C. and a third of 130° C.

SBM2: it is an S-B-M triblock copolymer in which S is polystyrene, B is polybutadiene and M is PMMA, comprising 12% as fraction by mass of polystyrene, 18% as fraction by mass of polybutadiene and 70% by mass of poly(methyl methacrylate), obtained by anionic polymerization successively of a polystyrene block with a number-average molar mass of 14,000 g/mol, of a polybutadiene block with a mass of 22,000 g/mol and of a poly(methyl methacrylate) block with a number-average molar mass of 85,000 g/mol. This product was prepared according to the procedure disclosed in EP 524,054 and in. EP 749,987. This product exhibits three glass transitions, one of −90° C., another of 95° C. and a third of 130° C.

SBM3: it is an S-B-M triblock copolymer in which S is polystyrene, B is polybutadiene and M is PMMA, comprising 24% as fraction by mass of polystyrene, 26% as fraction by mass of polybutadiene and 50% by mass of poly(methyl methacrylate), obtained by anionic polymerization successively of a polystyrene block with a number-average molar mass of 21,000 g/mol, of a polybutadiene block with a mass of 22,000 g/mol and of a poly(methyl methacrylate) block with a number-average molar mass of 43,000 g/mol. This product was prepared according to the procedure disclosed in EP 524,054 and in EP 749,987. This product exhibits three glass transitions, one of −90° C., another of 95° C. and a third of 130° C.

Preparation of the Blends Comprising Only Core-Shells as Impact Modifier:

The core-shell particles are dispersed in the BADGE using an Ultra-turrax at 5000 revolutions/min. The cycles are blending for 10 minutes followed by resting for 10 minutes, the final dispersing time being 3 hours. Furthermore, the container comprising BADGE and core-shell is continually immersed in an ice bath in order to prevent any heating. The blend is then brought to 100° C. (above the melting temperature of the amine) and the diamine is dispersed for 10 minutes using an Ultra-turrax at 5000 revolutions/minute. The blend is subsequently cast in a mould and cured.

Preparation of the Other Blends

The blends with a low percentage of impact modifier (≦10% by mass) were prepared using a reactor. The BADGE is introduced into the reactor and brought to 135° C. for a few minutes. The impact modifier is subsequently added and kneaded at 135° C. until it has completely dissolved. The kneading time depends on the nature of the impact modifier added. In our case, it was at most 12 hours. The diamine hardener is then added and blending is carried out for a further 5 minutes at 135° C. in order to obtain a homogeneous blend. The epoxy-amine reaction begins during this blending and it must therefore be arranged to be as short as possible. These blends are subsequently cast and cured in a mould. For blends with a level of impact modifier of greater than 10% by mass, a BADGE/impact modifier preblend comprising 10% by mass of impact modifier is prepared according to the following method: after having brought the BADGE to 135° C. for a few minutes, the impact modifier is added and blended at 135° C. until it has completely dissolved. The mass of impact modifier lacking to achieve the desired level is then blended with this preblend using a calender or a twin-screw mixer at 135° C. for one hour. The BADGE/impact modifier system obtained is then cool d and cryogenically milled and the amin powder is added. The final blend is pressed in a mould at the desired curing temperature.

Curing Conditions:

The blends comprising 10% of additives are precured for 14 hours at 135° C. and postcured for 4 hours at 190° C.

The blends comprising 30% of additives are precured for 20 hours at 135° C. and postcured for 4 hours at 190° C.

Measurement of the Impact Strengthening—Measurement of K1C

The K1C was measured at room temperature on notched three-point bending samples according to the procedure provided by Williams and Cawood (Polymer Testing, 9 (1990), 15–26). The test specimens are prenotched with a diamond saw. A finer crack is produced on the samples, clamped in a vice, using a razor blade, the razor blade being given a gentle tap which leads to cracking. This makes it possible to obtain a very fine crack root, similar to a natural crack. The total depth of the notch is measured using a binocular magnifier.

Measurement of the Glass Transition Temperature Tg by Thermomechanical Analysis:

Tg was measured by dynamic mechanical analysis on postcured samples using a Rheometrics device (Rheometrics Solid Analyser, RSAII). The samples, which are parallel-epipedal in shape ($1\times2.5\times34$ mm$^3$), are subjected to a temperature sweep between 50 and 250° C. at a stress frequency of 1 Hz. The glass transition temperature is taken at the maximum of tan δ.

Swelling Measurement:

A sample with a parallelepipedal shape, with dimensions of $20\times20\times1$ mm, is placed in a 100 ml beaker filled with toluene for a duration of 15 days. The beaker is kept hermetically sealed at room temperature. After immersion for 15 days, the sample is removed and its mass is monitored. The percentage of swelling is obtained by the following equation:

$$\% \text{ swelling} = [m(15 \text{ days}) - m(\text{initial})]/m(\text{initial})$$

The sample is subsequently dried and weighed again in order to monitor that none of the constituents of the material has been dissolved by the toluene.

Example 1

Advantage of the BM Diblocks and SBM Triblocks in Comparison with the Other Known Additives.

The various formulations recorded in Table 1 were prepared according to the experimental protocol described above. The results are in Table 2.

Comments:

The unstrengthened thermoset material (Control 1) is a transparent but brittle material with a very high Tg. The addition of polybutadiene homopolymer at a level of 5 or 10% presents a difficulty. During the stage of incorporation of the homopolymer in the BADGE, the dissolution of the first in the second is not complete. A completely homogeneous blend is not obtained. After curing, the material is opaque and exhibits virtually no strengthening (Controls 2 and 3). On the other hand, the incorporation of PMMA homopolymer is easy. The PMMA/BADGE blend is homogeneous and transparent and the material remains completely transparent after curing. However, the material does not exhibit any significant strengthening, whether 5% or 10% of PMMA is added (Controls 4 and 5). Control 5 has a lower Tg than that of the reference material (Control 1), 174° C. and 187° C. respectively. This fall is relatively limited. The addition of 5 or 10% of core-shell (Controls 6 and 7) does not present any difficulty and the initial blend has a homogeneous appearance. After curing, the material has a high Tg very close to that of the reference but the material has become opaque and no impact strengthening is observed. The results obtained with these various materials confirm that it is difficult to strengthen a thermoset material with a high Tg value while retaining its transparency and while not significantly lowering its glass transition temperature.

It is surprising to find that the addition of PMMA-b-PB B-M diblock results in a material which is strengthened in comparison with the material to which PB, PMMA or core-shell has been added. This is because the material of Test 1 has a K$_1$C of 0.95 whereas all the controls have a K$_1$C of between 0.6 and 0.7, very close to the pure epoxy material.

It should be noted that the strengthening obtained with the PMMA-b-PB diblock cannot be obtained with just any diblock since the material of Test 2, prepared with a PS-b-PB S-B diblock, does not exhibit any strengthening. It should also be noted that incorporation of the PS-b-PB diblock is not easy and that the material is opaque after curing.

The addition of a PMMA-b-PB B-M diblock results not only in a strengthening of the epoxy matrix but it furthermore makes it possible to retain the transparency of the material, which is crucial in some applications of these materials.

Test 3, carried out with an additive as disclosed in the closest prior art, a block copolymer of polycaprolactone-b-polydimethylsiloxane-b-polycaprolactone type, results in a transparent material, although the incorporation of the additive presents a difficulty: the BADGE/additive blend has a tendency to foam during the incorporation phase, which obliges the user to frequently halt the stirring in order to allow the foam formed to fall back. This material exhibits good impact strengthening, as disclosed in the prior art. The Tg of the material is 164° C. This Tg is equal to that of the material prepared during Test 1 with the PMMA-b-PB diblock. At equal Tg values, it is found that the PMMA-b-PB B-M diblock results in greater strengthening (K1C=0.95) than that contributed by the polycaprolactone-b-polydimethylsiloxane-b-polycaprolactone block copolymer (K1C=0.85). This difference is much greater than the experimental error and thus shows the superiority of this additive with respect to those described previously.

Tests 4, 5 and 6, carried out with PMMA-b-PB-b-PS S-B-M triblock copolymers, all result in transparent materials. The incorporation of the additive does not exhibit any difficulty. It has been found that the materials prepared exhibit higher Tg values than those of the materials of Tests 1 and 3, which is a significant advantage. These high Tg values are not obtained at the expense of the strengthening, since Test 6 exhibits the best strengthening which has been obtained.

Conclusion:

The block copolymers comprising an M block made of PMMA (PMMA-b-PB and PMMA-b-PB-b-PS) result in a significant strengthening of the matrix and retain the transparency of the material. In comparison with copolymers with different chemical natures disclosed in the prior art, these copolymers make it possible to obtain either greater strengthening and a higher Tg or an unchanging Tg and greater strengthening. These results illustrate the advantage of the invention.

TABLE 1

| Reference | BADGE | Amine | Impact modifier (nature) | Impact modifier (mass) | Impact modifier (weight %) |
|---|---|---|---|---|---|
| Control 1 | 80.21 | 39.84 | none | | |
| Control 2 | 76.17 | 37.83 | PB | 5.98 | 5 |
| Control 3 | 60.14 | 29.88 | PB | 10.08 | 10 |
| Control 4 | 76.15 | 37.82 | PMMA | 6.02 | 5 |
| Control 5 | 78.18 | 38.82 | PMMA | 13 | 10 |
| Control 6 | 165.03 | 81.96 | Core-shell 1 | 13 | 5 |
| Control 7 | 156.34 | 77.58 | Core-shell 1 | 26.03 | 10 |
| Test 1 | 72.19 | 35.89 | BM1 | 11.97 | 10 |
| Comp. Test 2 | 72.25 | 35.89 | SB1 | 11.96 | 10 |
| Comp. Test 3 | 72.15 | 35.83 | PCL-PDMS-PCL | 12.05 | 10 |
| Test 4 | 72.12 | 35.83 | SBM 1 | 12 | 10 |
| Test 5 | 72.11 | 35.85 | SBM 2 | 12 | 10 |
| Test 6 | 72.15 | 35.85 | SBM 3 | 12 | 10 |

TABLE 2

| Reference | Impact modifier (nature) | Impact modifier (%) | Transparency | K1C | Tg |
|---|---|---|---|---|---|
| Control 1 | none | | Yes | 0.65 | 187 |
| Control 2 | PB | 5 | No | 0.65 | |
| Control 3 | PB | 10 | No | 0.7 | |
| Control 4 | PMMA | 5 | Yes | 0.65 | |
| Control 5 | PMMA | 10 | Yes | 0.65 | 174 |
| Control 6 | Core-shell 1 | 5 | No | 0.66 | 182 |
| Control 7 | Core-shell 1 | 10 | No | 0.7 | 183 |
| Test 1 | BM1 | 10 | Yes | 0.95 | 164 |
| Comp. Test 2 | SB1 | 10 | No | 0.65 | |
| Comp. Test 3 | PCL-PDMS-PCL | 10 | Yes | 0.85 | 164 |
| Test 4 | SBM 1 | 10 | Yes | 0.77 | 175 |
| Test 5 | SBM 2 | 10 | Yes | 0.88 | 178 |
| Test 6 | SBM 3 | 10 | Yes | 1.01 | 184 |

Example 2

Synergistic Effects Contributed by the SBM Units

The various formulations recorded in Table 3 were prepared according to the experimental protocol described above. The results obtained are recorded in Table 4.

Comments:

The blends composed of two diblock copolymers, at least one of the two copolymers of which comprises a PMMA block, are found to behave in a very singular way. This is because the materials prepared from a blend of an S-B diblock and of a B-M diblock do not exhibit significant strengthening with respect to the non-additivated epoxy material, whereas, as has been seen above, the materials prepared from a PMMA-b-PB B-M diblock exhibit significant strengthening. Furthermore, the material is not transparent.

On the other hand, th three materials prepared from a blend of a PS-b-PB (S-B) diblock and of a PS-b-PB-b-PMMA (S-B-M) triblock exhibit significant strengthening and, surprisingly, it is found that, in the three cases studied (Tests 9, 10 and 11), the material which comprises 10% of (S-B)+S-B-M additive has a greater strength than the material prepared from 10% of S-B-M triblock, while S-B used alone has no strengthening effect. It is concluded therefrom that a surprising synergistic effect exists. This effect is all the more advantageous in that the transparency of the material is retained. The measurement of the Tg of the materials shows that the addition of an S-B+S-B-M blend has a minimum effect on the glass transition of the material. The invention makes it possible to obtain significant strengthening without loss of transparency and with a minimum reduction in the operating temperature of the material.

Test 11 is also particularly advantageous and surprising. While Core-shell 1 contributes no strengthening effect, whether it is added at a level of 5 or 10% (Controls 6 and 7), when it is added at a level of 5% with 5% of S-B-M triblock, the material obtained has an exceptional impact strength ($K_{1C}$=1.4). A particularly surprising synergistic effect contributed by the S-B-M triblock is thus again found.

TABLE 3

| Reference | BADGE | Amine | Impact modifier (nature) | Impact modifier (mass) | Impact modifier (weight %) |
|---|---|---|---|---|---|
| Comp. Test 7 | | | BM1 + SB3 | | 7 + 3 |
| Test 8 | 81 | 40.23 | SBM1 + SB1 | 10.78 + 2.7 | 8 + 2 |
| Test 9 | 80.99 | 40.23 | SBM2 + SB2 | 10.78 + 2.7 | 9 + 1 |
| Test 10 | 72.16 | 35.82 | SBM3 + SB3 | 7.81 + 4.21 | 6.5 + 3.5 |
| Test 11 | 156.38 | 77.64 | SBM2 + Core-shell 1 | 13.03 + 13 | 5 + 5 |

TABLE 4

| Reference | Impact modifier (nature) | Impact modifier (%) | Transparency | K1C | Tg |
|---|---|---|---|---|---|
| Comp. Test 7 | BM1 + SB3 | 7 + 3 | No | no strength | |
| Test 8 | SBM1 + SB1 | 8 + 2 | Yes | 0.81 | 178° C. |
| Test 9 | SBM2 + SB2 | 9 + 1 | Yes | 0.96 | 183° C. |
| Test 10 | SBM3 + SB3 | 6.5 + 3.5 | Yes | 1.04 | |
| Test 11 | SBM2 + Core-shell 1 | 5 + 5 | No | 1.4 | |

Example 3

Advantage of the Increase in the Percentage of Additives

The various formulations recorded in Table 5 were prepared according to the exp rimental protocol described above.

The results obtained are recorded in Table 6.

Comments:

In comparison with Control 1, which does not comprise additives, Tests 12 and 13, which comprise a blend of PS-b-PB-b-PMMA (S-B-M) triblock and of PS-b-PB (S-B) diblock at a level of 30%, exhibit very high impact strengthening. This strengthening is much greater than the levels obtained with these additives or with others introduced at a level of 10%. It is found that the introduction of this significant amount of additives does not interfere with the transparency of the final material.

Moreover, an essential characteristic of an epoxy-based thermoset material is its resistance to solvents. It is important for the material, of course, to be insoluble but, in addition, for it to exhibit a limited swelling in solvents. Toluene, which is a solvent which does not swell the control epoxy material and which, on the other hand, is an excellent solvent for S-B-M triblocks and S-B diblocks, has been chosen for this. This test is thus particularly strict. The swelling in toluene of the materials obtained during Tests 12 and 13 has been determined according to the method described above. Not only is it observed that the additives are not extracted by prolonged immersion of the material in toluene but it is found, furthermore, that these materials exhibit a swelling which is as slight as that of the reference pure epoxy material. Consequently, the addition of 30% of additive as described in the present invention has no harmful effect on the resistance to swelling in toluene of the material and makes possible considerable strengthening.

TABLE 5

| Reference | BADGE | Amine | Impact modifier (nature) | Impact modifier (mass) | Impact modifier (weight %) |
|---|---|---|---|---|---|
| Control 1 | 80.21 | 39.84 | none | | |
| Test 12 | 70.01 | 34.77 | SBM1 + SB1 | 35.87 + 8.97 | 24 + 6 |
| Test 13 | 73.15 | 38.33 | SBM2 + SB2 | 42.15 + 4.68 | 27 + 3 |

TABLE 6

| Reference | Impact modifier (nature) | Impact modifier (weight %) | Transparency | K1C | Degree of swelling in toluene |
|---|---|---|---|---|---|
| Control 1 | none | | yes | 0.65 | 1% |
| Test 12 | SBM1 + SB1 | 24 + 6 | yes | 1.53 | 1% |
| Test 13 | SBM2 + SB2 | 27 + 3 | yes | 1.27 | 1% |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Thermoset material with improved impact resistance comprising:

99 to 20% of a thermoset resin, and 1 to 80% of an impact modifier comprising at least one copolymer comprising S-B-M, B-M and M-B-M blocks, wherein:

each block is connected to the other by a covalent bond or an intermediate molecule connected to one of the blocks via a covalent bond and to the other block via another covalent bond, the M blocks of the block copolymers comprise at least 60% by weight of syndiotactic PMMA, B is incompatible with the thermoset resin and with the M block and its glass transition temperature Tg is less than 0° C., and S is incompatible with the thermoset resin, the B block and the M block and its Tg or its melting temperature is greater than the Tg of B.

2. Material according to claim 1, wherein the Tg of the B blocks of the block copolymers is less than −40° C.

3. Material according to claim 2, wherein the B blocks of the block copolymers are predominantly composed of 1,4-polybutadiene.

4. Material according to claim 1, wherein the Tg or the melting point of S is greater than 23° C.

5. Material according to claim 4, wherein the Tg or the melting point of S is greater than 50° C.

6. Material according to claim 5, in which S is polystyrene.

7. Material according to claim 1, wherein the number-average molar mass of the block copolymers can be between 10,000 g/mol and 500,000 g/mol.

8. Material according to claim 7, wherein the number-average molar mass of the block copolymers can be between 20,000 g/mol and 200,000 g/mol.

9. Material according to claim 1, wherein the proportion of impact modifier is from 1 to 35% for respectively 99 to 65% of thermoset resin.

10. Material according to claim 9, wherein the proportion of impact modifier is from 8 to 32% for respectively 92 to 68% of thermoset resin.

11. Material according to claim 1, wherein all or part of the S-B-M triblock is replaced with an M-S-B-S-M or M-B-S-B-M pentablock.

12. Material according to claim 1, wherein the thermoset resin originates from the reaction of a thermosetting epoxy resin and of a hardener.

13. Thermoset material with improved impact resistance comprising:

99 to 20% of a thermoset resin, and 1 to 80% of an impact modifier comprising at least one copolymer selected from the group consisting of M-B-M block copolymers and S-B-M block copolymers and at least one polymer selected from the group consisting of core-shells (A), functionalized elastomers, S-B block copolymers, ATBN reactive rubbers and CTBN reactive rubbers, wherein:

each block is connected to the other by a covalent bond or an intermediate molecule connected to one of the blocks via a covalent bond and to the other block via another covalent bond, M is a PMMA homopolymer, or a copolymer comprising at least 50% by weight of methyl methacrylate, and B is incompatible with the thermoset resin and with the M block and its glass transition temperature Tg is less than 0° C., and S is incompatible with the thermoset resin, the B block and the M block and its Tg or its melting temperature is greater than the Tg of B.

14. Material according to claim 13, wherein in the S-B diblock:

is incompatible with the thermoset resin and with the M block and its glass transition temperature Tg is less than 0° C., and S is incompatible with the thermoset resin, the B block and the M block and its Tg or its melting temperature is greater than the Tg of B.

15. Material according to claim 14, in which the S-B diblock has a number-average molar mass which is between 10,000 g/mol and 500,000 g/mol.

16. Material according to claim 14, wherein the Tg of the B blocks of the block copolymers is less than −40° C.

17. Material according to claim 16, wherein the B blocks of the block copolymers are predominantly composed of 1,4-polybutadiene.

18. Material according to claim 14, wherein the dienes of the B block are hydrogenated.

19. Material according to claim 14, wherein the B block is composed of poly(butyl acrylate).

20. Material according to claim 14, wherein the Tg or the melting temperature of S is greater than 23° C.

21. Material according to claim 20, wherein the Tg or the melting temperature of S is greater than 50° C.

22. Material according to claim 21, wherein S is polystyrene.

23. Material according to claim 22, in which the reactive monomer is glycidyl methacrylate or tert-butyl methacrylate.

24. Material according to claim 13, wherein the impact modifier comprises at least one S-B-M block copolymer and at least one S-B block copolymer.

25. Material according to claim 13, wherein the impact modifier comprises at least one S-B-M block copolymer and at least one core-shell polymer (A).

26. Material according to claim 13, wherein the impact modifier comprises at least one S-B-M block copolymer, at least one ATBN or CTBN reactive rubber and optionally an S-B block copolymer.

27. Thermoset material with improved impact resistance comprising:
    99 to 20% of a thermoset resin, and
    to 80% of an impact modifier comprising at least one copolymer comprising S-B-M, B-M and M-B-M blocks,
    wherein:
        each block is connected to the other by a covalent bond or an intermediate molecule connected to one of the blocks via a covalent bond and to the other block via another covalent bond,
        the M blocks of the block copolymers comprise reactive monomers,
        B is incompatible with the thermoset resin and with the M block and its glass transition temperature Tg is less than 0° C., and
        S is incompatible with the thermoset resin, the B block and the M block and its Tg or its melting temperature is greater than the Tg of B.

28. Thermoset material with improved impact resistance comprising:
    99 to 20% of a thermoset resin, and
    1 to 80% of an impact modifier comprising at least one copolymer comprising S-B-M, B-M and M-B-M blocks,
    wherein:
        each block is connected to the other by a covalent bond or an intermediate molecule connected to one of the blocks via a covalent bond and to the other block via another covalent bond,
        M is a PMMA homopolymer or a copolymer comprising at least 50% by weight of methyl methacrylate,
        B is incompatible with the thermoset resin and with the M block and its glass transition temperature Tg is less than 0° C., further wherein the B blocks of the block copolymers comprise hydrogenated dienes, and
        S is incompatible with the thermoset resin, the B block and the M block and its Tg or its melting temperature is greater than the Tg of B.

29. Thermoset material with improved impact resistance comprising:
    99 to 20% of a thermoset resin, and
    1 to 80% of an impact modifier comprising at least one copolymer comprising S-B-M, B-M and M-B-M blocks,
    wherein:
        each block is connected to the other by a covalent bond or an intermediate molecule connected to one of the blocks via a covalent bond and to the other block via another covalent bond,
        M is a PMMA homopolymer, or a copolymer comprising at least 50% by weight of methyl methacrylate,
        the B block comprises poly(butyl acrylate), and
        S is incompatible with the thermoset resin, the B block and the M block and its Tg or its melting temperature is greater than the Tg of B.

30. Thermoset material with improved impact resistance comprising:
    99 to 20% of a thermoset resin, and
    1 to 80% of an impact modifier comprising at least one copolymer comprising S-B-M, B-M and M-B-M blocks and either an M-S-B-S-M or an M-B-S-B-M pentablock,
    wherein:
        each block is connected to the other by a covalent bond or an intermediate molecule connected to one of the blocks via a covalent bond and to the other block via another covalent bond,
        M is a PMMA homopolymer or a copolymer comprising at least 50% by weight of methyl methacrylate,
        B is incompatible with the thermoset resin and with the M block and its glass transition temperature Tg is less than 0° C., and
        S is incompatible with the thermoset resin, the B block and the M block and its Tg or its melting temperature is greater than the Tg of B.

31. Thermoset material with improved impact resistance comprising:
    99 to 20% of a thermoset resin, and
    1 to 80% of an impact modifier comprising at least one copolymer comprising B-M and M-B-M blocks and either an M-S-B-S-M or an M-B-S-B-M pentablock,
    wherein:
        each block is connected to the other by a covalent bond or an intermediate molecule connected to one of the blocks via a covalent bond and to the other block via another covalent bond,
        M is a PMMA homopolymer or a copolymer comprising at least 50% by weight of methyl methacrylate,
        B is incompatible with the thermoset resin and with the M block and its glass transition temperature Tg is less than 0° C., and
        S is incompatible with the thermoset resin, the B block and the M block and its Tg or its melting temperature is greater than the Tg of B.

\* \* \* \* \*